US008655660B2

(12) United States Patent
Szalai et al.

(10) Patent No.: US 8,655,660 B2
(45) Date of Patent: Feb. 18, 2014

(54) METHOD FOR DYNAMIC LEARNING OF INDIVIDUAL VOICE PATTERNS

(75) Inventors: Zsolt Szalai, Tourrettes-sur-Loup (FR); Philippe Bazot, Vence (FR); Bernard Pucci, Cagnes sur Mer (FR); Joel Vitale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/368,349

(22) Filed: Feb. 10, 2009

(65) Prior Publication Data

US 2010/0153108 A1 Jun. 17, 2010

(30) Foreign Application Priority Data

Dec. 11, 2008 (EP) ..................... 08305914

(51) Int. Cl.
*G10L 15/06* (2013.01)
*G10L 13/00* (2006.01)

(52) U.S. Cl.
USPC ........... 704/260; 704/243; 704/246; 704/277; 704/278; 704/E15.001

(58) Field of Classification Search
USPC ............. 704/243, 246, 270, 270.1, 271, 273, 704/260, 277, 278, E15.004, E15.007, 704/E15.014, E19.007
See application file for complete search history.

(56) References Cited

U.S. PATENT DOCUMENTS

| | | | |
|---|---|---|---|
| 4,763,350 A * | 8/1988 | Immendorfer et al. .... | 379/88.03 |
| 5,632,002 A * | 5/1997 | Hashimoto et al. ........... | 704/231 |
| 5,794,204 A | 8/1998 | Miyazawa et al. | |
| 5,911,129 A * | 6/1999 | Towell ........................ | 704/270.1 |
| 5,933,805 A * | 8/1999 | Boss et al. ..................... | 704/249 |
| 5,983,177 A * | 11/1999 | Wu et al. ....................... | 704/244 |
| 6,289,085 B1 * | 9/2001 | Miyashita et al. ......... | 379/88.02 |
| 6,963,841 B2 * | 11/2005 | Handal et al. ................. | 704/270 |
| 7,292,980 B1 * | 11/2007 | August et al. ................. | 704/254 |
| 7,685,523 B2 * | 3/2010 | Calderone et al. ............ | 715/728 |
| 7,707,033 B2 * | 4/2010 | Geurts .......................... | 704/241 |
| 7,974,841 B2 * | 7/2011 | Bengtsson .................... | 704/233 |
| 7,987,144 B1 * | 7/2011 | Drissi et al. ..................... | 706/20 |
| 7,987,244 B1 | 7/2011 | Lewis et al. | |
| 8,010,368 B2 * | 8/2011 | Yamaki ......................... | 704/275 |
| 8,131,549 B2 * | 3/2012 | Teegan et al. ................. | 704/260 |
| 2002/0035474 A1 | 3/2002 | Alpdemir | |
| 2002/0069054 A1 * | 6/2002 | Arrowood et al. ............ | 704/233 |
| 2002/0188449 A1 | 12/2002 | Nukaga et al. | |
| 2003/0128859 A1 * | 7/2003 | Greene et al. ................. | 381/351 |
| 2004/0098266 A1 * | 5/2004 | Hughes et al. ................ | 704/277 |
| 2004/0111271 A1 * | 6/2004 | Tischer ......................... | 704/277 |

(Continued)

OTHER PUBLICATIONS

U.S. Appl. No. 12/368,352, filed Feb. 10, 2009, Office Action dated Feb. 17, 2012.

(Continued)

*Primary Examiner* — Pierre-Louis Desir
*Assistant Examiner* — Abdelali Serrou
(74) *Attorney, Agent, or Firm* — Douglas A. Lashmit; Hoffman Warnick LLC

(57) ABSTRACT

The present invention is a system and method for generating a personal voice font including, monitoring voice segments automatically from phone conversations of a user by a voice learning processor to generate a personalized voice font and delivering the personalized voice font (PVF) to the a server.

15 Claims, 5 Drawing Sheets

(56) References Cited

U.S. PATENT DOCUMENTS

| | | | |
|---|---|---|---|
| 2005/0108013 A1* | 5/2005 | Karns | 704/254 |
| 2005/0203743 A1* | 9/2005 | Hain et al. | 704/258 |
| 2005/0273330 A1 | 12/2005 | Johnson | |
| 2006/0095265 A1 | 5/2006 | Chu et al. | |
| 2006/0111904 A1* | 5/2006 | Wasserblat et al. | 704/246 |
| 2007/0038459 A1 | 2/2007 | Zhou et al. | |
| 2007/0055523 A1* | 3/2007 | Yang | 704/257 |
| 2007/0124144 A1 | 5/2007 | Johnson | |
| 2007/0174396 A1* | 7/2007 | Kumar et al. | 709/206 |
| 2007/0203705 A1* | 8/2007 | Ozkaragoz et al. | 704/260 |
| 2008/0082332 A1 | 4/2008 | Mallett et al. | |
| 2008/0235024 A1* | 9/2008 | Goldberg et al. | 704/260 |
| 2008/0291325 A1* | 11/2008 | Teegan et al. | 348/552 |

OTHER PUBLICATIONS

U.S. Appl. No. 12/368,352, filed Feb. 10, 2009, Office Action dated Aug. 20, 2012.

U.S. Appl. No. 12/368,352, NFR dated Oct. 29, 2013, 17 pages.

\* cited by examiner

METHOD FOR DYNAMIC LEARNING OF INDIVIDUAL VOICE PATTERNS

CROSS REFERENCE TO RELATED APPLICATIONS

This application relates to commonly assigned copending application U.S. Ser. No. 12/368,352, entitled METHOD FOR STORING AND RETRIEVING VOICE FONTS filed simultaneously herewith. This application claims priority to European patent application number 08305914.7, filed Dec. 11, 2008.

FIELD OF THE INVENTION

The present invention relates to the field of continuous speech recognition and more particularly to automatic learning or a person's voice and generation of a personal voice font (PVF).

BACKGROUND OF THE INVENTION

Text-to-speech (TTS) is a technology that converts computerized text into synthetic speech. The speech is produced in a voice that has predetermined characteristics, such as voice sound, tone, accent and inflection. These voice characteristics are embodied in a voice font. A voice font is typically made up of a set of computer-encoded speech segments having phonetic qualities that correspond to phonetic units that may be encountered in text. When a portion of text is converted, speech segments are selected by mapping each phonetic unit to the corresponding speech segment. The selected speech segments are then concatenated and output audibly through a computer speaker.

TTS is becoming common in many environments. A TTS application can be used with virtually any text-based application to audibly present text. For example, a TTS application can work with an email application to essentially "read" a user's email to the user. A TTS application may also work in conjunction with a text messaging application to present typed text in audible form. Such uses of TTS technology are particularly relevant to user's who are blind, or who are otherwise visually impaired, for whom reading typed text is difficult or impossible. More generally, TTS participates in the evolution toward computer natural user interfaces.

In some TTS systems, the user can choose a voice font from a number of pre-generated voice fonts. The available voice fonts typically include a limited set of voice patterns that are unrelated to the author of the text. The voice fonts available in traditional TTS systems are unsatisfactory to many users. Such unknown voices are not readily recognizable by the user or the user's family or friends. Thus, because these voices are unknown to the typical receiver of the message, these voice fonts do not add as much value or are as meaningful to the receiver's listening experience as could otherwise be achieved.

Additionally, there is no described method to support dynamic acquisition of PVFs to support reading out a text file using the author's voice.

The present invention provides a solution to these problems.

SUMMARY OF THE INVENTION

In one embodiment of the present invention a method for generating a personal voice font is provided including, monitoring voice segments automatically from phone conversations of a user by a voice learning processor to generate a personalized voice font (PVF) based on this particular user's personal voice characteristic and delivering the (PVF) to a server.

In another embodiment of the present invention a system for generating a personal voice font is provided. The system includes a server for monitoring and storing voice segments automatically from phone conversations of a user, and a voice learning processor configured for generating a personalized voice font (PVF) based on the stored voice segments. The system delivers the PVF to the server.

In a further embodiment of the present invention a computer program stored on a storage medium is provided. The computer program when executed monitors voice segments automatically from phone conversations of a user by a voice learning processor to generate a personalized voice font (PVF), and delivers the PVF to a server.

In another embodiment of the present invention a method for deploying a system for generating a personal voice font is disclosed. The invention comprises providing a computer infrastructure being operable to monitor voice segments automatically from phone conversations of a user by a voice learning processor to generate a personalized voice font (PVF), and deliver the (PVF) to a server.

BRIEF DESCRIPTION OF THE SEVERAL VIEWS OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION OF THE INVENTION

The present invention automatically provides a Personal Voice Font (PVF). A PVF is a digital representation of a person's voice pattern. A PVF characterizes the voice of one specific person. One person may own several PVFs, e.g., to reflect the evolution of his/her voice over time, or to represent the same person in multiple languages.

Once created, the PVF becomes available for consumption by Text-To-Speech functions for reading text items out with the particular person's personal voice pattern. Sharing of a PVF can be used in a wide variety of applications.

This disclosure further introduces a method whereby a system can dynamically learn a person's voice pattern and deliver the corresponding PVF to a stored location for use by a receiver of a message containing text from the person. The invention uses routine phone calls, to minimize the need for the person to dedicate time and effort to the learning of his/her voice pattern by the system. During the learning process, the system monitors the phone calls of the person, and collects the voice pattern elements required to characterize this specific person's voice. The process is iterative, and repeats until the system determines that it has collected all the required voice pattern elements. The system may generate an intermediate PVF between iterations to allow for an appreciation of the progress. After the last iteration, the system generates the final PVF.

This dynamic learning method may, however, be implemented so that its mechanisms can also be used to support voice pattern learning over dedicated system training sessions. Such alternative is useful, for example, for persons who require the generation of their PVF more rapidly.

The end-to-end process of the voice pattern learning method of the present invention can be broken down into four main elements, each of which will be described in more detail below.

1. Subscription to a voice pattern learning service
2. Initial system setup
3. Voice pattern learning over voice communications monitoring
4. Post-processing, including delivery of the voice pattern characterization as a Personal Voice Font.

Several reasons may make a person want to update his/her already existing PVF, e.g., change in voice over time or encoding technology evolution. The update of a PVF uses a process similar to the four-step process described above.

Figure 1:
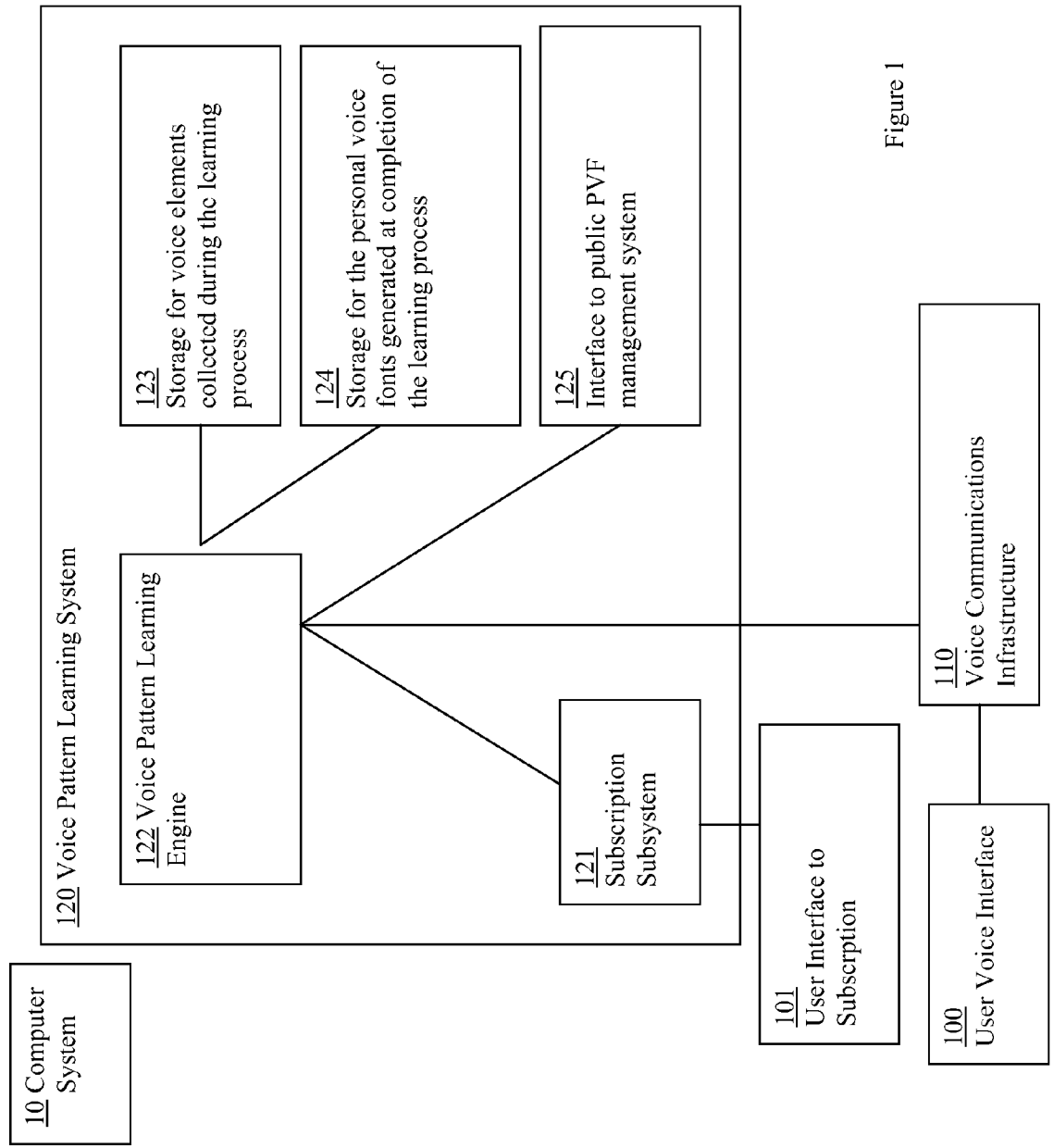
FIG. 1 is a schematic block diagram of the voice pattern learning system of an embodiment of the present invention.

FIG. 1 is a block diagram of the system of the present invention embodied on a computer system 10. Block 100 represents an interface designated by the user for the voice pattern learning process. Block 101 represents a user interface to the subscription function. Any particular interface type that adequately performs the subscription function can be employed. A Voice Communications Infrastructure 110 connects the user's voice interface for the general purpose of voice communications with other users. The Voice Communications Infrastructure 110 contains enhancements for connecting the user's voice interface to the learning system. The infrastructure 110 can be public or private.

The Voice Pattern Learning System 120 is described including identification and function of the components. A subscription subsystem 121 results in the system being set up and personalized. The voice pattern learning engine 122 is the element that receives the audio signals for the learning processes and creates the PVF. The interface with the voice communications infrastructure 110 determines the start of telephone calls used for monitoring the user's voice. Optionally, a temporary data storage 123 may be used to store elements of the user's voice. After completion of the pattern learning by the voice pattern learning engine 122, a PVF is generated and stored in storage element 124. If the generated PVF is to be published or made available to select receivers, an interface 125 to an external system is invoked to request allocation of a universal voice identifier (UVI), to allow for export the newly created PVF to an authorized receiver.

1. Subscription to a Voice Pattern Learning Service

Figure 2:
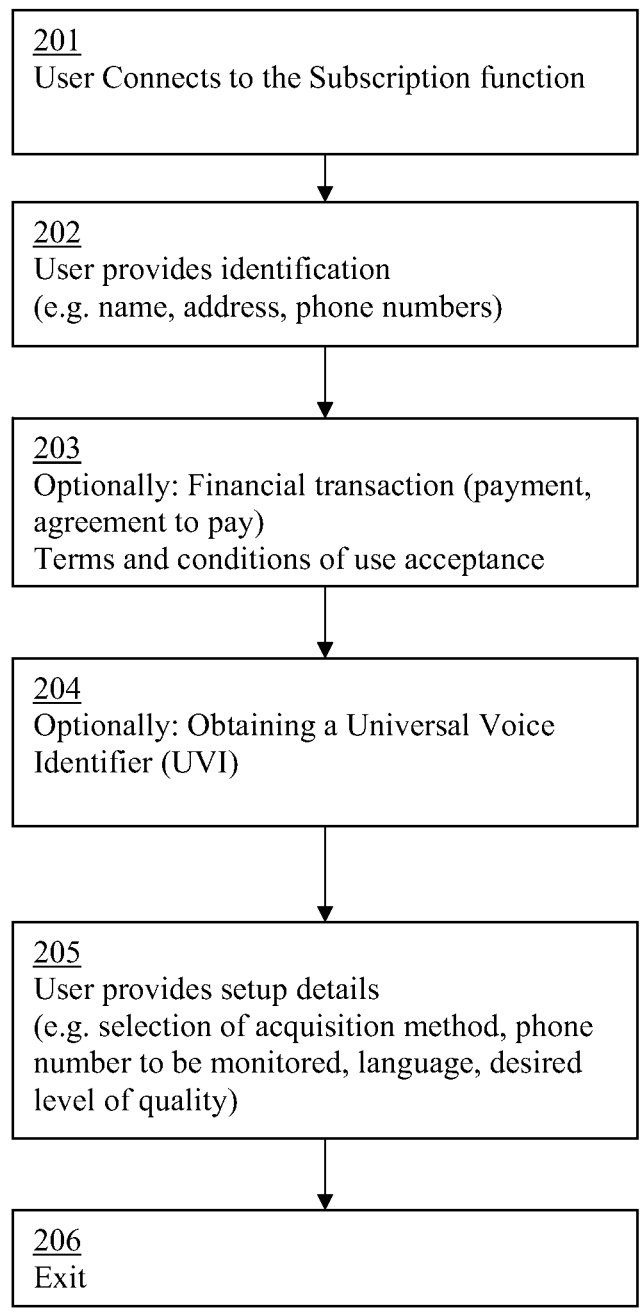
FIG. 2 is a schematic block diagram of the subscription process used in an embodiment of the present invention.

Subscription is the set of administrative actions that will enable the activation of the voice pattern learning process for one particular person. A simplified flow chart of the subscription process is shown in FIG. 2. Block 201 shows the connection of a user to the subscription service. No particular access method is assumed for the connection to the subscription function. Internet or intranet site, mailed paper forms, phone calls to an agent are all valid examples of connection means. Block 202 shows some of the details required by the service from the user. Again, no particular form of identification to the learning system is required. Personalized names are possible as well as full set of contact details, depending on the policy of the service provider. Optionally, a payment clearance step 203 is shown but if this is used within a business it may not be necessary. A requirement for the user agreeing to the Terms and Conditions of the service would be expected and is shown in step 203. If the user has the intent to publish the PVF, obtaining a Universal Voice Identifier (UVI) is required (block 204) although this could be done at various times throughout the subscription process or after the PVF is created. The user selects from available options to tailor the service to his/her preference in block 205. Options typically include the learning method (monitoring of phone calls or dedicated session), language (at least one PVF would be generated for each language), level of quality (the service may offer different levels of accuracy for the reproduced voice). The user leaves the subscription system in block 206. In the case of a successfully completed subscription process, the system is prepared to support the initial connection of the newly subscribed user.

2. Initial System Setup

Figure 3:
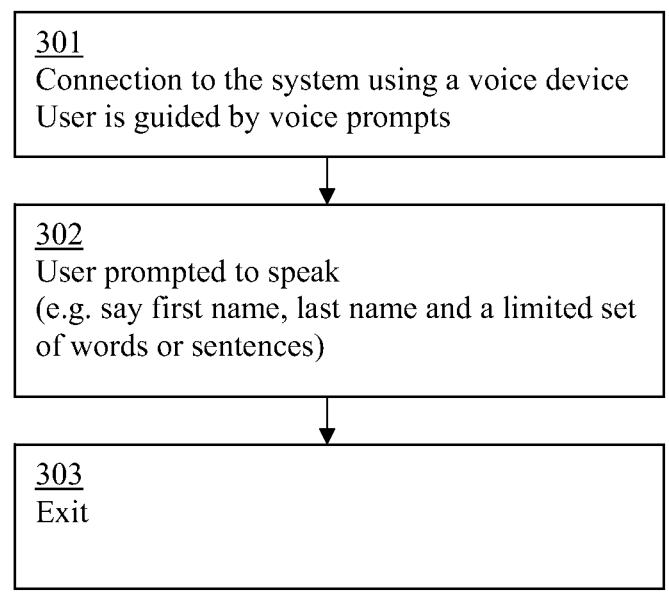
FIG. 3 is a schematic block diagram of the iterative learning process used in an embodiment of the present invention.

FIG. 3 shows the initial set up of the voice pattern learning engine. Monitoring of a particular voice interface is activated after successful subscription to the service by a particular user and initial setup. In the initial setup, the system guides the user through voice prompts (block 301) and an initialization step where the user is prompted to speak his or her name and a limited set of words or phrases (block 302). When the initialization step is complete (block 303), the Voice Pattern Learning System (VPLS) will recognize the user's voice and can begin gathering data automatically for generation of a PVF. The system after initialization, automatically records phone conversations to gather data to generate a PVF and is shown in FIG. 4.

3. Voice Pattern Learning Over Voice Communications Monitoring

Figure 4:
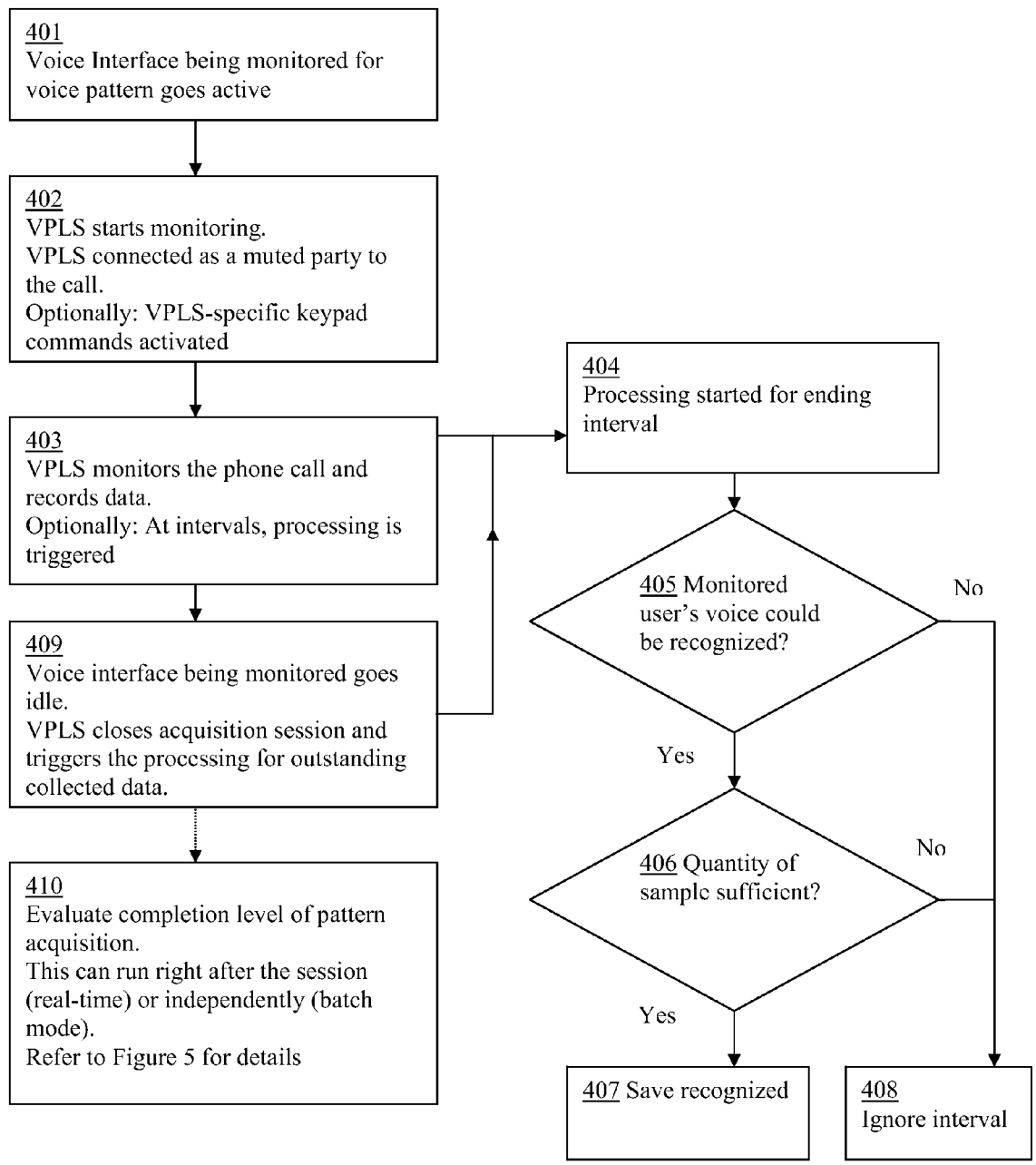
FIG. 4 is a logic diagram of the voice pattern learning process used in the present invention.

A voice interface being monitored engages in a communication in block 401 of FIG. 4. The Voice Pattern Learning System (VPLS) 402 detects this event over the interface with the voice communications infrastructure (110 FIG. 1), and is connected into the call as an additional and passive party. VPLS connection can be implemented to be automatic or manual at the user's initiative. Optionally, VPLS is implemented to supports commands, e.g., numerical key codes entered from the phone keypad allowing control by the user, for example:

| | |
|---|---|
| N1 | Resume process |
| N2 | Stop process until resume requested |
| N3 | Skip this voice session |
| N4 | Start learning over from zero |

The VPLS collects voice pattern related data during the voice conversation in block 403. Collected data is processed at the end of the call or, in an optional implementation, at regular intervals. The processing in block 404 includes recognizing the subscriber's voice (block 405), filtering out other voices, and updating the voice pattern data collected for the particular user over previous sessions in the temporary data store. If the user's voice could not be recognized in block 405 in the collected data, the data will be ignored. In block 406, if the quality of the collected data is insufficient (for instance due to a poor connection, with significant static), the data will be ignored (block 408). It is recommended that a mechanism that detects repeating failing data collections, and takes corrective (e.g., alerting) action be included. The VPLS generates an error message if recognizable voice segments are not useful. Where the voice of the user is recognized, it is collected, isolated, and translated into usable voice pattern characteristics. It is used to update the specific user's entry in the temporary store (block 407). When the voice communication ends VPLS detects the event and triggers the processing of the remaining collected data. In block 410 the collection and interpretation of data is performed.

The data collected for a particular subscriber is evaluated against learning completion criteria. If evaluation concludes positively, processing continues with the generation of the PVF for the user.

Figure 5:
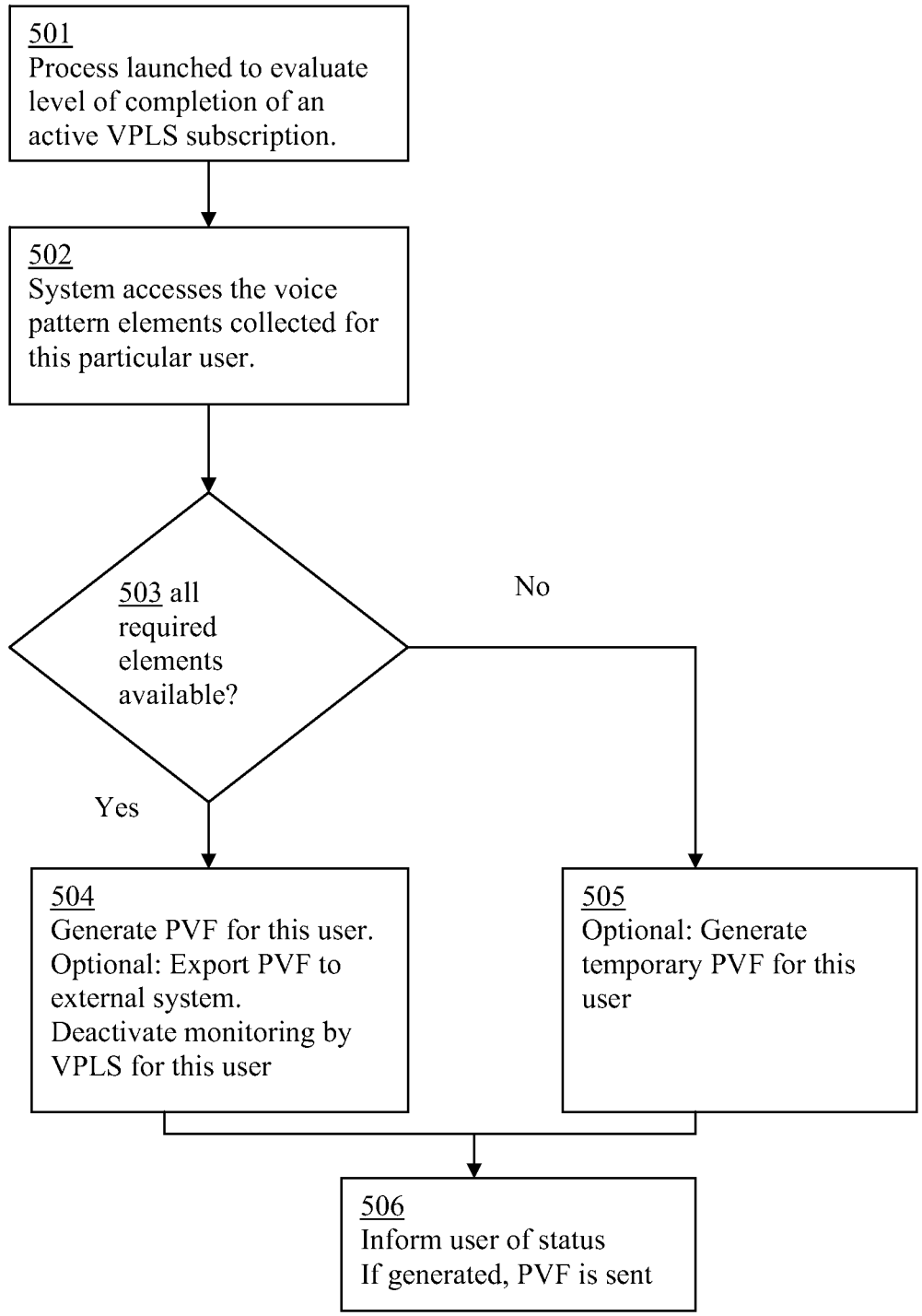
FIG. 5 is a logic diagram of the last step of voice pattern learning process used in the present invention.

4. Post-Processing, Including Delivery of the Voice Pattern Characterization as a Personal Voice Font FIG. 5 shows the last step in the process and can be initiated synchronously with FIG. 4, i.e., individually for each user at the end of each monitoring session, or asynchronously, i.e., for a batch of users. The diagram shows the logic flow for post-processing for one subscriber. In the case of batch processing, the logic takes the form of a loop. The evaluation to determine the level of completion is initiated in block 501. The data collected for a particular user is retrieved from temporary storage (block 502). Analysis is performed against the data, and a conclusion taken on the degree of completion of the voice pattern acquisition for this subscriber in block 503. If the collected data has been found to be complete, VPLS generates the PVF for this subscriber in block 504. The PVF includes the voice pattern characterization together with a reference to the CODEC that was used for the encoding. If the PVF is to be made available to receivers, it is exported to a PVF management system. This would include obtaining a (UVI) if not already done at VPLS service subscription time. Monitoring of the voice interface registered with this subscription is de-activated at this point. If the analysis in block 503 determines that all the elements for generating a PVF are not complete, in block 505, generation of an interim PVF may optionally be performed. In block 506, the VPLS informs the subscriber of the level of completion of the learning process. If a PVF has been generated, it is sent to the user.

It is understood that a computer system may be implemented as any type of computing infrastructure. A computer system generally includes a processor, input/output (I/O), memory, and at least one bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. A bus provides a communication link between each of the components in the computer system and likewise may comprise any known type of transmission link, including electrical, optical, wireless, etc. Although not shown, additional components, such as cache memory, communication systems, system software, etc., may be incorporated into a computer system. Local storage may comprise any type of read write memory, such as a disk drive, optical storage, USB key, memory card, flash drive, etc.

Access to a computer system and network resources may be provided over a network such as the Internet, a local area network (LAN), a wide area network (WAN), a virtual private network (VPN), wireless, cellular, etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising an on demand application manager could be created, maintained and/or deployed by a service provider that offers the functions described herein for customers. That is, a service provider could offer to deploy or provide application management as described above.

It is understood that in addition to being implemented as a system and method, the features may be provided as a program product stored on a computer-readable medium. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

The invention has been described in detail with particular reference to certain preferred embodiments thereof, but it will be understood that variations and modifications can be effected within the spirit and scope of the invention.

What is claimed is:

1. A method for generating a personal voice font comprising:
   training a voice learning processor to:
   having a user speak a name of the user and a set of words to provide for recognition of a voice of the user by the voice learning processor;
   automatically gathering a plurality of phone conversations of the user when the voice learning processor recognizes the voice of the user;
   filtering out voices that do not correspond to the voice of the user from the plurality of phone conversations of the user;
   extracting recognized voice pattern data of the user from the plurality of filtered phone conversations of the user;
   generating a level of completion message for extracting the recognized voice pattern data to the user after each of the plurality of phone conversations of the user;
   generating an error message to the user when the recognized voice pattern data from one of the plurality of phone conversations of the user is not useful, and ignoring the not useful recognized voice data;
   generating a personalized voice font (PVF) when sufficient recognized voice pattern data of the user is extracted from the plurality of phone conversations of the user based on the level of completion that indicates completion of the extracted voice pattern data and generating a temporary PVF when the level of completion indicates incomplete extraction of voice pattern data; and
   delivering the (PVF) to a server.

2. The method of claim 1, further comprising:
   creating a universal voice identifier through which the PVF can be made available to a receiver.

3. The method of claim 1, wherein the voice learning processor discards unrecognizable voice segments from the plurality of phone conversations of the user.

4. The method of claim 1, wherein the monitoring can be initialized, stopped, resumed or restarted by the user.

5. The method of claim 1, wherein subscription to the voice learning processor is required.

6. The method of claim 1, wherein the user instructs the voice learning processor through numerical key codes on a phone.

7. A system for generating a personal voice font comprising:
   training a voice learning processor by having:
   a server for automatically monitoring and storing a plurality of phone conversations of a user wherein the user initializes the system by speaking a name of the user and a set of words to provide for recognition of a voice of the user by the voice learning processor;
   the voice learning processor configured to filter out voices that do not correspond to the voice of the user from the plurality of phone conversations of the user, to extract recognized voice pattern data of the user from the plurality of filtered phone conversations of the user, to generate a level of completion message to extract the recognized voice pattern data to the user for each of the plurality of phone conversations of the user; to generate an error message to the user when the recognized voice pattern data from one of the plurality of phone conversations of the user is not useful, and ignoring the not useful recognized voice data, and to generate a personalized voice font (PVF) when sufficient recognized voice pattern data of the user is extracted from the plurality of phone conversations of the user based on the level of completion that indicates completion of the extracted voice pattern data and generating a temporary PVF when the level of completion indicates incomplete extraction of voice pattern data; and delivering the PVF to the server.

8. The system of claim 7, wherein the voice learning processor creates a universal voice identifier associated with the PVF so that the PVF can be made available to a receiver.

9. The system of claim 7, wherein the voice learning processor discards unrecognizable voice segments from the plurality of phone conversations of the user.

10. The system of claim 7, wherein the server monitoring can be initialized, stopped, resumed or restarted by the user.

11. The system of claim 7, wherein subscription is required.

12. A non-transitory computer readable medium having a computer program product stored thereon that when executed on a computer comprises:
    training a voice learning processor by:
    automatically monitoring and storing a plurality of phone conversations of a user wherein the user initializes the system by speaking a name of the user and a set of words to provide for recognition of a voice of the user;
    filtering out voices that do not correspond to the voice of the user from the plurality of phone conversations of the user,
    extracting recognized voice pattern data of the user from the plurality of filtered phone conversations of the user;
    generating a level of completion message for extracting the recognized voice pattern data to the user after each of the plurality of phone conversations of the user;
    generating an error message to the user when the recognized voice pattern data from one of the plurality of phone conversations of the user is not useful, and ignoring the not useful recognized voice data;
    generating a personalized voice font (PVF) when sufficient recognized voice pattern data of the user is extracted from the plurality of phone conversations of the user based on the level of completion that indicates completion of the extracted voice pattern data and generating a temporary PVF when the level of completion indicates incomplete extraction of voice pattern data; and
    delivering the (PVF) to a server.

13. The non-transitory computer readable medium of claim 12, further comprising:
    creating a universal voice identifier through which the PVF can be made available to a receiver.

14. The non-transitory computer readable medium of claim 12, further comprising:
    discarding unrecognizable voice segments from the plurality of phone conversations of the user.

15. A method for deploying a system for generating a personal voice font comprising:
    training a voice learning processor by:
    providing a computer infrastructure being operable to:
    have a user speak a name of the user and a set of words to provide for recognition of a voice of the user by the voice learning processor;
    automatically gather a plurality of phone conversations of the user when the voice learning processor recognizes the voice of the user;

filter out voices that do not correspond to the voice of the user from the plurality of phone conversations of the user;
extract recognized voice pattern data of the user from the plurality of filtered phone conversations of the user;
generate a level of completion message for extracting the recognized voice pattern data to the user after each of the plurality of phone conversations of the user;
generate an error message to the user when the recognized voice pattern data from one of the plurality of phone conversations of the user is not useful, and ignoring the not useful recognized voice data;
generate a personalized voice font (PVF) when sufficient recognized voice pattern data of the user is extracted from the plurality of phone conversations of the user based on the level of completion that indicates completion of the extracted voice pattern data and generating a temporary PVF when the level of completion indicates incomplete extraction of voice pattern data; and
deliver the (PVF) to a server.

* * * * *